Patented Jan. 17, 1928.

1,656,769

UNITED STATES PATENT OFFICE.

GIAN ALBERTO BLANC, OF ROME, ITALY.

METHOD FOR THE SEPARATION OF CHLORIDES OF ALUMINUM AND POTASSIUM PRESENT IN MIXED SOLUTIONS OBTAINED IN THE TREATMENT OF LEUCITE.

No Drawing. Application filed October 19, 1921, Serial No. 508,807, and in Italy March 7, 1921.

It is known that by treating leucite with hydrochloric acid mixed solutions of aluminum chloride and potassium chloride are obtained, from which solutions the separation of the two salts cannot be effected without tedious and expensive processes.

According to my invention the separation of the two chlorides as obtained from leucite, and their full recovery without recurring to the costly evaporation of the liquor, can be effected by means of a cycle of operations in which no losses of materials occur.

Hot solutions of the two salts may be obtained in a state of high saturation by conveniently determining the proportions of water and acid used in the attack of the leucite. By a simple cooling down to ordinary temperature of the said hot and saturated solutions, they deposit a large portion of the potassium chloride, while the aluminum chloride is pratically all retained in the solution, owing to its very high solubility.

The cooled liquid contains the residual portion of potassium chloride that saturates the solution at the lowest temperature reached by the liquid, so that it would now not be feasible to precipitate it without recurring to the expensive means of evaporation with the corresponding consumption of fuel.

After having separated the deposited crystals of potassium chloride, the remaining mother liquor is saturated with gaseous hydrochloric acid, according to any one of the usual processes, viz., either by causing the gas to gurgle through the liquid, or by letting the latter fall or sprinkle through an atmosphere of gaseous hydrochloric acid.

By this operation the chloride of aluminum, which, as it is known, precipitates from its solutions when the latter are saturated with gaseous hydrochloric acid, separates completely in a pure crystalline form.

The residual liquor, saturated with hydrochloric acid but no longer containing aluminum chloride, and only containing some potassium chloride, can be used for attacking another charge of leucite.

By conveniently replacing the amount of water subtracted in the crystallization process of the aluminum chloride, which has been separated, it is thus possible to obtain again another hot solution highly concentrated with aluminum chloride and potassium chloride from which both salts can be separated in a very pure state by repeating the above mentioned series of operations.

In so doing finally, a mother liquor is obtained identical with the one from which the process was started for the second treatment and fit to be used for the attack of a third charge of leucite and so on.

In this manner, starting from the second treatment, by using a solution already charged with the amount of potassium chloride which saturates it at the lowest temperature reached in the cooling process, it becomes possible to obtain practically at each successive operation the totality of the potassium chloride contained in the leucite and correspondingly, of course, the total amount of the aluminum chloride.

I claim as my invention:

The process for the separation of the chlorides of aluminum and potassium present in the mixed solutions which are obtained by treating leucite with hydrochloric acid said process comprising the following steps in cyclical succession: (1) cooling the hot solution of the two chlorides down to the ambient temperature thereby causing the crystallization of most of the chloride of potassium of which remains dissolved only the amount which saturates the solution at the lowest temperature reached; (2) saturating with gaseous hydrochloric acid the liquid resulting from the operation sub 1 so as to cause the aluminum chloride it contains to precipitate in a crystalline state; (3) using the mother liquor saturated with hydrochloric gas, resulting from the operation sub 2, for attacking another charge of leucite and obtaining again a hot concentrated solution of aluminum and potassium chlorides.

In testimony whereof I have affixed my signature.

GIAN ALBERTO BLANC.